US012662046B2

(12) United States Patent
Kubitza et al.

(10) Patent No.: US 12,662,046 B2
(45) Date of Patent: Jun. 23, 2026

(54) HEADLAMP FOR VEHICLES AND PROJECTION METHOD

(71) Applicant: Hella GmbH & Co. KGaA, Lippstadt (DE)

(72) Inventors: Boris Kubitza, Möhnesee-Körbecke (DE); Carsten Wilks, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 114 days.

(21) Appl. No.: 18/650,862

(22) Filed: Apr. 30, 2024

(65) Prior Publication Data

US 2024/0278715 A1    Aug. 22, 2024

Related U.S. Application Data

(63) Continuation of application No. PCT/EP2022/080180, filed on Oct. 28, 2022.

(30) Foreign Application Priority Data

Nov. 9, 2021    (DE) ..................... 10 2021 129 089.9

(51) Int. Cl.
  *B60Q 1/50*    (2006.01)
  *B60Q 1/00*    (2006.01)
  *B60Q 1/12*    (2006.01)

(52) U.S. Cl.
  CPC ........... *B60Q 1/543* (2022.05); *B60Q 1/0023* (2013.01); *B60Q 1/12* (2013.01); *B60Q 2300/114* (2013.01); *B60Q 2300/122* (2013.01); *B60Q 2300/132* (2013.01); *B60Q 2400/50* (2013.01)

(58) Field of Classification Search
  CPC ........ B60Q 1/543; B60Q 1/0023; B60Q 1/12; B60Q 2300/114; B60Q 2300/122; B60Q 2300/132; B60Q 2400/50; B60Q 1/115; B60Q 1/143; B60Q 1/50; H05B 47/105
  USPC .......................................................... 340/901
  See application file for complete search history.

(56) References Cited

U.S. PATENT DOCUMENTS 5,645,338 A * 7/1997 Kobayashi ............. B60Q 1/085
                                                              362/276
5,660,454 A * 8/1997 Mori ........................ B60Q 1/12
                                                              362/466

FOREIGN PATENT DOCUMENTS

| DE | 102011081394 B3 | 10/2012 |
| DE | 102011081395 A1 | 2/2013 |
| DE | 102016120222 A1 | 4/2018 |
| DE | 102018214843 A1 | 2/2019 |
| DE | 102015208795 B4 | 9/2019 |
| EP | 0355539 A2 * | 2/1990 ............. B60Q 1/115 |

(Continued)

*Primary Examiner* — Eric Blount
(74) *Attorney, Agent, or Firm* — Husch Blackwell LLP

(57) ABSTRACT

A headlamp for vehicles that has a light source unit. Numerous light sources and/or light guides are controllable individually. A sensor unit for detects headlamp status data and/or vehicle environment data. A control unit for controlling the light sources and/or light guides generates a predefined light distribution for the headlamp. The range of the headlamp can be adjusted on the basis of sensor signals from the sensor unit. The control unit contains a control element for the light sources and/or light guides for projecting a guide marking onto a road surface. The control unit contains a compensator that compensates for deviations in the guide marking on the basis of a sensor signal generated by the sensor unit.

15 Claims, 3 Drawing Sheets

(56)    References Cited

FOREIGN PATENT DOCUMENTS

| EP | 847895 A2 | 6/1998 | |
|----|-----------|--------|--|
| EP | 3258166 B1 * | 10/2023 | ............. F21S 43/31 |
| JP | 6983011 B2 * | 12/2021 | ............. B60Q 1/115 |

* cited by examiner

| Nickwinkel φ in ° | Kompensationssignal |
|---|---|
| +5 | K5 |
| +4 | K4 |
| +3 | K3 |
| +2 | K2 |
| +1 | K1 |
| 0 (Referenzlage) | ~ |
| -1 | K1' |
| -2 | K2' |
| -3 | K3' |
| -4 | K4' |
| -5 | K5' |

HEADLAMP FOR VEHICLES AND PROJECTION METHOD

CROSS REFERENCE

This application claims priority to PCT Application No. PCT/EP2022/080180, filed Oct. 28, 2022, which itself claims priority to German Application No. 10 2021 129 089.9, filed Nov. 9, 2021, the entireties of both of which are hereby incorporated by reference.

FIELD OF THE INVENTION

The invention relates to a headlamp for vehicles that has a light source unit containing numerous light sources and/or light guides that can be controlled individually, a sensor unit for detecting headlamp status data and/or vehicle environment data, a control unit for controlling the light sources and/or light guides to generate a predefined light distribution of the headlamp, in which the range of the headlamp can be set on the basis of control signals from the sensor unit.

The invention also relates to a method for projecting a guide marking onto a road surface for vehicles that comprises controlling numerous light sources and/or light guides in a light source unit such that the guide marking for a predefined path, which is based on a vehicle operating parameter, is continuously projected onto the road surface while the vehicle is traveling.

BACKGROUND OF THE INVENTION

A headlamp for vehicles is disclosed in DE 10 2016 120 222 A1 that contains a light source unit with numerous light sources or light guides that can be controlled individually. This is a high resolution headlamp. There is a sensor unit for detecting headlamp status data or vehicle environment data, e.g. a vehicle inclination angle. The headlamp contains a control unit for the light source unit, which can be both an electronic control unit and a mechanical control unit. If the vehicle accelerates or decelerates, the deviations in the pitch angle in relation to a reference angle at a constant speed are evaluated by the control unit and compensated for, such that the light source unit is controlled with a control signal that has been modified when the vehicle accelerates or decelerates to maintain a constant headlamp range. If the light distribution is for a non-blinding high beam, or a low beam, an oncoming or leading vehicle is not blinded.

A headlamp for vehicles is disclosed in DE 2015 208 795 B4 in which the headlamp range is set on the basis of spring compression. It is also set on the basis of vertical acceleration.

Control of a light source unit in a headlamp such that a guide marking is projected onto a road surface that helps the driver steer when traveling in a straight line or a curve is disclosed in DE 10 2011 081 394 B3. The guide marking can be a tracking line or lane for the vehicle that is projected onto the road surface in front of the vehicle. A sensor unit for detecting the vehicle environment, e.g. with a camera, and vehicle driving parameters, is used by a control unit to determine an anticipated guide marking path, and therefore the movement of the vehicle. This quickly provides the driver with visual information regarding whether the vehicle is still in the lane, or has made a lane change.

Because the guide marking in the form of a tracking line extends in the direction of travel, and therefore extends over a relatively large vertical range on a measurement screen, the guide marking may be distorted if the angle of the headlamp or vehicle changes in relation to the horizontal axis. Parallel tracking lines then converge at a distance to the vehicle, which a driver may find disruptive.

BRIEF SUMMARY OF THE INVENTION

The object of the present invention is therefore to create a headlamp for vehicles and a method for projecting guide markings onto a road surface such that these markings remain substantially unaffected by changes in the operating or status parameters of the vehicle.

The control unit contains a control element for the light sources and/or light guides with which a guide marking is projected onto a road surface, in which changes in the guide markings can be compensated for on the basis of a sensor signal generated by a sensor unit.

According to an embodiment of the invention, the guide markings are projected onto a road surface on the basis of the steering angle of the vehicle, preferably exclusively on the basis of the current steering angle, in which disruptive movements of the headlamp or vehicle are compensated for, e.g. pitching or tilting movements in relation to the horizontal axis, which is transverse to the longitudinal axis of the vehicle. The driver consequently always sees the same predefined guide marking, thus minimizing undesired deviations from the intended direction of travel. This allows the driver to concentrate on the potential hazards in front of the vehicle, while the guide marking indicates the current position of the vehicle, or direction of travel, in the traffic lane. The invention contains a compensator with which the effects of disruptive movements of the headlamp or vehicle to the visualization of the guide marking are minimized.

According to a preferred embodiment of the invention, the compensator is designed to coordinate the guide markings to an operating state or movement of the vehicle when the vehicle is moving at a constant speed. The headlamp assumes a reference position on a flat road surface when travelling at a constant speed. If the vehicle is no longer in this operating state, e.g. due to pitching motions when accelerating or decelerating, any undesired changes caused by this are compensated for, such that the guide markings correspond to those in the reference position, in which the vehicle travels at a constant speed on a flat road surface.

According to one embodiment of the invention, the compensator is designed to adjust the headlamp range on the basis of the operating state of the vehicle and/or an inclination in relation to the reference position for the headlamp. Advantageously, both the range and guide markings are adjusted when the vehicle deviates from the reference position.

According to one embodiment of the invention, the control unit for the light sources and/or light guides ensures that the headlamp range in the reference position is based on a predefined light distribution for an operating state of the vehicle. The range can therefore be advantageously adjusted to a highway light distribution, urban area light distribution, or low beam light distribution.

According to one embodiment of the invention, the light sources and/or light guides in the light source unit are attached to a stationary mount in a headlamp housing. Because the light sources and light guides can be controlled individually, e.g. switched on and off, or dimmed, there is no need for an additional mechanical device for moving the light sources or light guides.

According to one embodiment of the invention, the guide markings are parallel to the lane lines on a road surface. These markings are preferably two lines that are spaced apart by the width of the vehicle. This provides the driver with a visual indication of the movement of the vehicle.

According to one embodiment of the invention, the compensator contains a compensation dataset (control table) containing different pitch angles assigned to different compensation signals. Consequently, different compensation signals are generated for different pitch angles of the light source unit, such that the current control signals are adjusted to obtain the same guide markings at all times, corresponding to the reference position. By reducing the increments between the values, the changes to the guide markings during pitching movements are reduced.

According to one embodiment of the invention, intermediate values between adjacent values for the pitch angles in the compensation data set are calculated through interpolation, thus reducing computing demands for determining compensation values while the vehicle is travelling.

According to one embodiment of the invention, the light source unit and control unit are placed in the headlamp housing. The control unit for the light sources and light guides can also be outside the headlamp housing.

The special advantage of the method according to the invention is that changes in the guide markings when the vehicle accelerates or decelerates are compensated for, such that the guide markings remain substantially unchanged.

According to one embodiment of the invention, the light sources and/or light guides are controlled with a control signal such adjusts both the guide markings and the headlamp range. The guide markings are normally part of the light distribution, and differ from adjacent parts of the light distribution in that they are brighter.

According to one embodiment of the invention, the headlamp range and guide markings are set on the basis of an operating parameter for the vehicle in the form of a detected inclination angle (pitch angle). This inclination angle (pitch angle) can be determined by an axle sensor or inclination sensor. The sensors can be acceleration sensors, cameras, or lidar sensors, with which compensation values can be calculated relatively quickly.

According to one embodiment of the invention, compensation values are obtained from a control table (compensation dataset) containing values for different pitch angles, in order to obtain the compensation signal as quickly as possible. Computing can be reduced by interpolation of intermediate values between the values.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
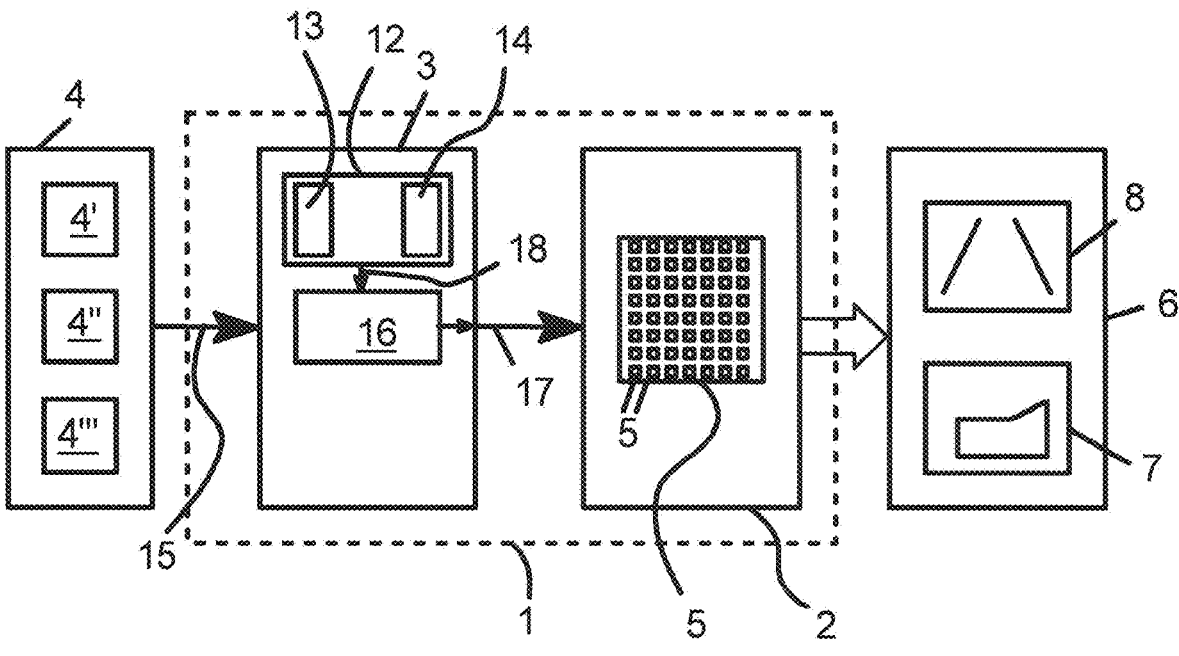
FIG. 1 shows a block diagram of a first embodiment of the device according to the invention.

A headlamp for a vehicle has a housing 1 containing a light source unit 2 and a control unit 3 for the light source unit. There is a sensor unit 4 outside the housing.

In this exemplary embodiment, the light source unit 2 contains numerous light sources 5 that are arranged in a matrix, e.g. on a chip, and can be controlled individually. The light sources 5 can have a dedicated optical element, e.g. a lens and/or reflector, with which the individual light sources 5 are focused into pixels forming a predefined light distribution 7, e.g. a low beam light distribution, projected onto a road surface 6 in front of the vehicle. This is a high resolution headlamp, the matrix of which contains 256 rows and 64 columns, thus obtaining over 16,000 pixels.

According to an alternative embodiment of the invention, the light source unit 2 can also contain light guides, e.g. a digital micromirror device (DMD), a liquid-crystal display (LCD), or liquid crystal on silicon (LCoS), with which the desired light distribution, or an additional guide marking 8, is generated.

The guide marking 8 in the present exemplary embodiment is composed of two tracking lines 9, 9', which converge in front of the vehicle when it its traveling in a straight path, corresponding to the perspective impression of the lane lines 10, 11 on the road surface. The tracking lines 9, 9' are straight lines, like the solid lane line 10 on the edge of the road surface and the broken lane line 11 in the middle of the road.

Figure 2:
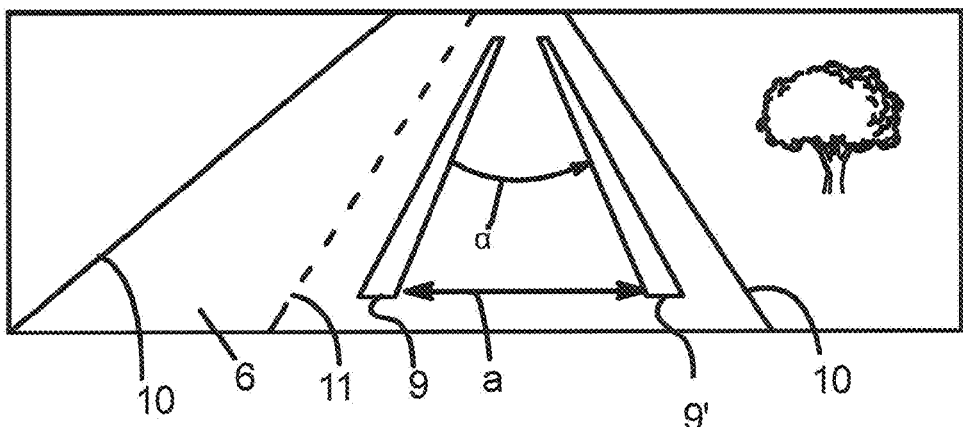
FIG. 2 shows guide markings when the vehicle is traveling in a straight line, with the headlamp in a reference position.

The straight tracking lines 9, 9' are as far apart in front of the vehicle as the width thereof, or the distance between the front wheels. This image of the guide marking 8 shows the driver the intended path for the vehicle. At a constant speed, the tracking lines 9, 9' of the guide marking 8 indicate the path shown in FIG. 2, in which the headlamp, or the light source unit 2 is in a reference position. The tracking lines 9, 9' converge at an angle $\varphi$.

Figure 3:
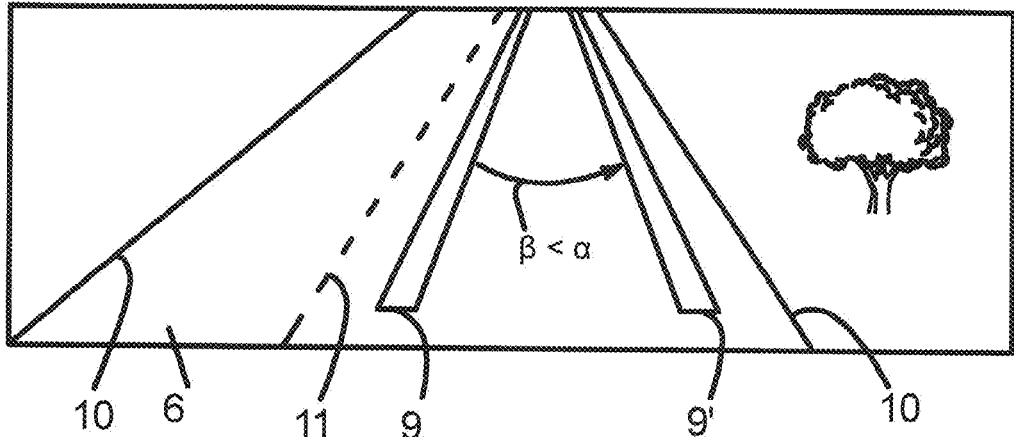
FIG. 3 shows the guide markings when the vehicle accelerates.

When the vehicle accelerates, the tracking lines 9, 9' converge at an angle $\beta$, which is smaller than the angle $\alpha$ when the headlamp is in the reference position (at a constant speed of the vehicle), as shown in FIG. 3.

Figure 4:
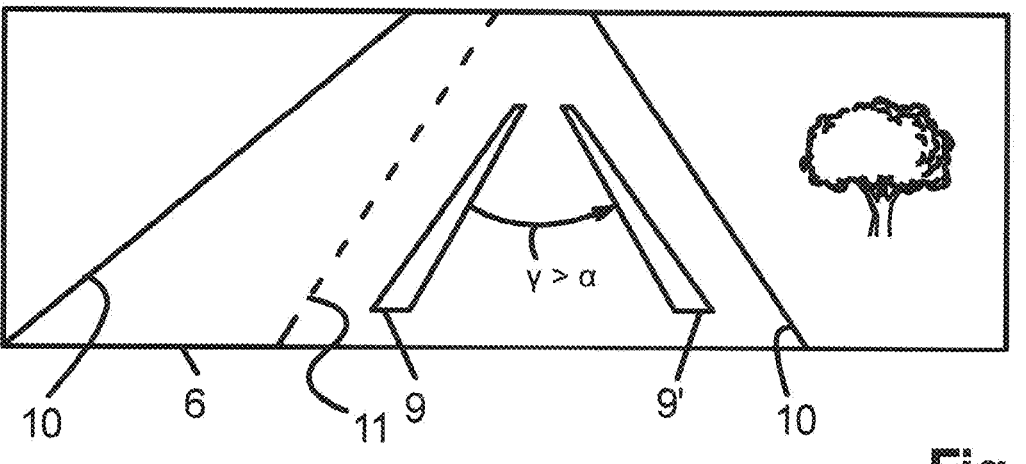
FIG. 4 shows the guide markings when the vehicle decelerates.

When the vehicle decelerates, the tracking lines 9, 9' converge at an angle $\gamma$, which is greater than the angle $\alpha$ when the headlamp is in the reference position, as shown in FIG. 4. Consequently, the guide marking 8 changes in relation to the vehicle during acceleration or deceleration, which is disruptive for the driver. To prevent this, the control unit 3 has a compensator 12. The compensator 12 contains a range compensator 13 that adjusts the headlamp range, and a guide marking compensator 14 that adjusts the guide marking 8 in the event of a disruption. The disruption is detected by the sensor unit 4, which contains numerous sensors 4', 4", 4'''. A first sensor 4' can be an axle sensor, or inclination sensor. A second sensor 4" can be an acceleration sensor. A third sensor 4''' can be a camera.

The sensor unit 4 generates a sensor signal 15 that is sent to the control unit 3. The control unit 3 contains a control element 16 that processes and evaluates the sensor data (sensor signal 15), and sends a control signal 17 to the light source unit 2. When the sensor signal 15 indicates a disruption, e.g. acceleration or deceleration of the vehicle, the control signal 17 is generated on the basis of a compensation signal 18, which is determined by the compensator 12. In addition, an adjustment of the headlamp range is calculated by the range compensator 13. An adjustment of the guide marking 8 is determined during the disruption by the guide marking compensator 14. The compensation signal 18 acts on the control element 16 such that when the vehicle accelerates or decelerates, the position of the guide marking 8 is altered such that it corresponds to that at a constant speed. The compensation signal 18 also adjusts the headlamp range during acceleration or deceleration, such that other road users are not blinded, and such that it corresponds to that at a constant speed.

It is assumed that at a constant speed, the headlamp is in a reference position. Inclination of the vehicle is only indicated by the sensor signal 15 when the roadway is uneven, or during acceleration or deceleration, resulting in a disrupted position of the vehicle or headlamp.

The headlamp range adjustment applies to numerous light distributions, e.g. the low beam light distribution, highway light distribution, urban light distribution, etc.

The guide marking compensator 14 contains a compensation data set (control table), preferably in the form of a table, containing numerous compensation values K1, K2, K3, K4, K5, and K1', K2', K3', K4', K5' that are assigned to different pitch angles (inclination angles) φ. The pitch angle φ is detected by the inclination sensor 4'. When the headlamp is in the reference position, i.e. at a constant speed on a flat road 6, the pitch angle φ is zero. The headlamp is in a default setting, or reference position. When the pitch angle φ is between −5° and +5°, corresponding compensation values K1, K2, K3, K4, K5, or K1', K2', K3', K4', K5' are calculated and stored in 1° increments.

If a pitch angle φ of +1° is detected, the compensation signal K1 is obtained from the compensation dataset, and if the pitch angle φ increases to +2°, the compensation signal K2 is obtained from the compensation data set.

To prevent undesired jumps in the guide marking 8, intermediate values for the compensation signals 18 are calculated through interpolation between adjacent pitch angles, such that when the disrupted position of the headlamp changes, the driver does not notice any change in the position of the guide marking.

The control element 16 evaluates the compensation signals 18 from the range compensator 13 and the guide marking compensator 14 such that the headlamp range and the guide marking 8 are adjusted simultaneously.

According to an alternative embodiment of the invention, not shown herein, the control unit 3 can also be outside the headlamp housing.

Figures 5, 6:
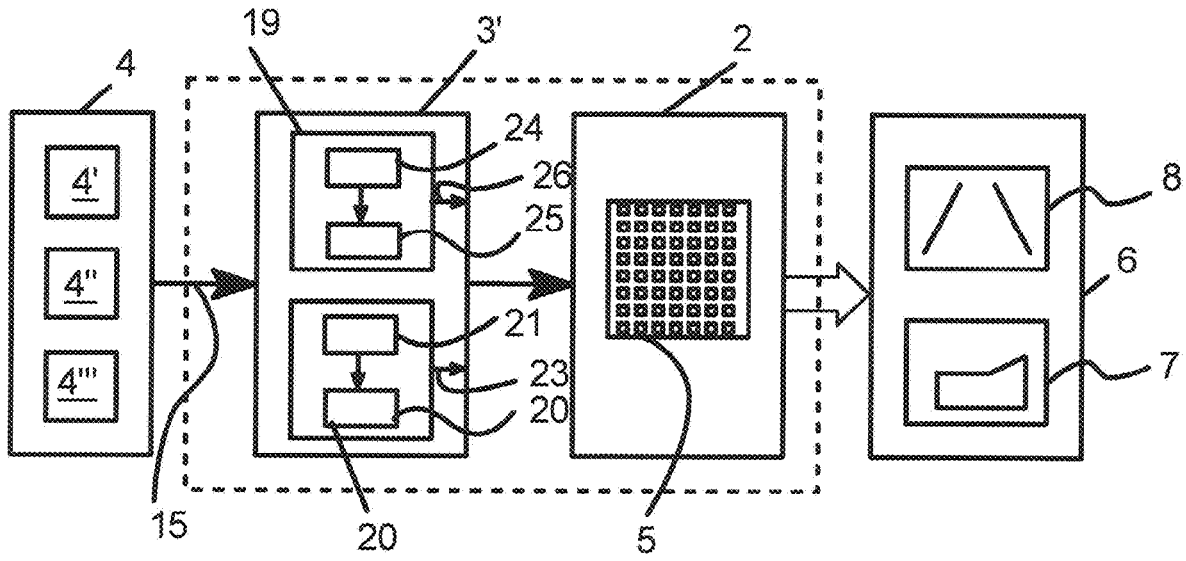
FIG. 5 shows a control table with pitch angle values assigned to compensation values.
FIG. 6 shows a block diagram for an alternative embodiment of the device according to the invention.

According to another embodiment of the invention, shown in FIG. 6, the control unit 3' contains a headlamp range control unit 19 and a guide marking control unit 20. The guide marking control unit 20 is a supplementary control unit, which can be inside or outside the headlamp housing. The guide marking control unit 20 contains a guide marking compensator 21 and a control element 22. The control signal 23 generated by the guide marking control unit 20 is used to adjust the current guide marking 8 when the position of the headlamp is disrupted.

The headlamp range control unit 19 contains a range compensator 24 and a control element 25. The control signal 26 generated by the range compensator 19 acts on the light source unit 2 such that the range is adjusted when the position of the headlamp is disrupted. In this embodiment, the headlamp range and guide marking 8 are adjusted independently of one another.

According to the embodiment of the invention shown in FIG. 1, the control signal 17 is generated by the control unit 3, which acts on the light source unit 2 such that the headlamp range and the guide marking 8 are adjusted when the position of the headlamp is disrupted, in which case the guide marking 8 is altered such that it assumes the same position when the vehicle is tilted that it would be in if the vehicle were not tilted, i.e. the headlamp were in the reference position. Even when the position of the headlamp is disrupted, in particular when the vehicle tilts, the headlamp range and guide marking 8 remain the same.

The adjustment of the headlamp range and guide marking 8 therefore takes place on the basis of operating parameters for the vehicle determined by the sensor unit 4.

The guide marking 8 is always adjusted to the current pitch angle, in particular by the calculated and interpolated compensation values K1, K2, K3, K4, K5, or K1', K2', K3', K4', K5' with the invention while the vehicle is in operation.

According to an alternative embodiment of the invention, not shown herein, the guide marking can be straight or curved line, and/or surface area, and/or symbol.

LIST OF REFERENCE SYMBOLS 1 housing
2 light source unit,
3, 3' control unit
4-4''' sensor unit
5 light source
6 road surface
7 light distribution
8 guide marking
9, 9' tracking lines
10 lane line
11 middle line
12 compensator
13 headlamp range compensator
14 guide marking compensator
15 sensor signal
16 control element
17 control signal
18 compensation signal
19 headlamp range control unit
20 guide marking control unit
21 guide marking compensator
22 control element
23 control signal
24 headlamp range compensator
25 control element
26 control signal
a spacing
φ pitch angle/inclination angle
K1-K5 compensation values
K1'-K5' compensation values

The invention claimed is:
1. A headlamp for a vehicle, the headlamp comprising:
a light source unit comprising a plurality of light sources and/or light guides that can be controlled individually;
a sensor unit for detecting headlamp status data and/or vehicle environment data; and
a control unit for controlling the plurality of light sources and/or light guides to generate a predefined light distribution for the headlamp, wherein a range of the headlamp is adjustable based on sensor signals from the sensor unit,
wherein the control unit comprises a control element for the plurality of light sources and/or light guides for projecting a guide marking on a road surface,
wherein the guide marking comprises two tracking lines that converge in front of the vehicle at a convergence angle when the vehicle is traveling in a straight path, and wherein the control unit comprises a compensator that compensates for deviations in the convergence angle between the tracking lines of the guide marking based on a sensor signal generated by the sensor unit.

2. The headlamp according to claim 1, wherein the compensator compensates for the deviations in the convergence angle between the tracking lines of the guide marking based on an operating state of the vehicle and/or an inclination of the light source unit.

3. The headlamp according to claim 2, wherein the compensator adjusts the range of the headlamp based on the operating state of the vehicle and/or to compensate for an inclination of the headlamp in relation to a reference position thereof.

4. The headlamp according to claim 3, wherein the control unit is configured such that the range of the headlamp in the reference position thereof is dependent on a predefined light distribution for an operating state of the vehicle.

5. The headlamp according to claim 1, wherein the plurality of light sources and/or light guides in the light source unit are attached to a mount that remains stationary in a housing for the headlamp.

6. The headlamp according to claim 1, wherein the tracking lines form two lane markings that are parallel to lane markings.

7. The headlamp according to claim 1, wherein the compensator comprises a compensation dataset in which different pitch angles ($\varphi$) are assigned different compensation values, such that the light source unit is controlled with different compensation signals for the compensation values for the different pitch angles ($\varphi$).

8. The headlamp according to claim 7, wherein the pitch angles ($\varphi$) are listed in 1° increments.

9. The headlamp according to claim 7, wherein intermediate values between the pitch angles ($\varphi$) are calculated through interpolation.

10. The headlamp according to claim 1, wherein the light source unit and the control unit are contained in a same housing for the headlamp.

11. The headlamp according to claim 1, wherein the control unit for controlling the range of the plurality of light sources and/or light guides and/or a position of the guide marking is outside a housing for the headlamp.

12. A method for projecting a guide marking onto a road surface via a headlamp for a vehicle, the method comprising:

controlling a plurality of light sources and/or light guides in a light source unit, such that the guide marking for a predefined path, which is based on a vehicle operating parameter, is continuously projected onto the road surface while the vehicle is traveling, wherein the guide marking comprises two tracking lines that converge in front of the vehicle at a convergence angle when the vehicle is traveling in a straight path, and setting the path of the guide marking based on the vehicle operating parameter, wherein the vehicle operating parameter includes an inclination angle ($\varphi$) detected for the vehicle, and wherein deviations in the convergence angle between the tracking lines of the guide marking are compensated for based on the vehicle operating parameter.

13. The method according to claim 12, wherein the plurality of light sources and/or light guides are controlled with a control signal with which the guide marking and a range of the headlamp are set.

14. The method according to claim 12, wherein a range of the headlamp and the guide marking are set based on the detected inclination angle.

15. The method according to claim 12, wherein the plurality of light sources and/or light guides for generating guide markings on the road surface is controlled using a control table containing values for the inclination angle ($\varphi$).

* * * * *